United States Patent
Brooks

(10) Patent No.: US 9,352,528 B1
(45) Date of Patent: May 31, 2016

(54) SELF-SUPPORTING COLLAPSIBLE AND RETRACTABLE ELONGATE MEMBER AND METHOD OF RETRACTING

(71) Applicant: Todd D. Brooks, Prior Lake, MN (US)

(72) Inventor: Todd D. Brooks, Prior Lake, MN (US)

( * ) Notice: Subject to any disclaimer, the term of this patent is extended or adjusted under 35 U.S.C. 154(b) by 168 days.

(21) Appl. No.: 14/243,569

(22) Filed: Apr. 2, 2014

(51) Int. Cl.
*G01B 3/10* (2006.01)
*B32B 1/08* (2006.01)
*B32B 3/28* (2006.01)
*B32B 3/26* (2006.01)
*B65H 75/48* (2006.01)

(52) U.S. Cl.
CPC . *B32B 1/08* (2013.01); *B32B 3/266* (2013.01); *B32B 3/28* (2013.01); *B65H 75/48* (2013.01); *G01B 3/1005* (2013.01); *G01B 2003/102* (2013.01)

(58) Field of Classification Search
CPC ............. G01B 3/1082; G01B 2003/1058; G01B 2003/1051; G01B 3/08; G01B 3/1005; G01B 3/1056; G01B 3/1084; G01B 2003/1089; G01B 2003/1092; G01B 2003/1046; G01B 3/1041; G01B 2003/102
USPC ............. 33/757, 771, 755, 760, 764, 767
See application file for complete search history.

(56) References Cited

U.S. PATENT DOCUMENTS

| | | | |
|---|---|---|---|
| 3,032,151 A | | 5/1962 | Allen |
| 3,042,990 A | * | 7/1962 | Zelnick .................... B29C 55/00 139/426 R |
| 3,434,254 A | * | 3/1969 | Rubin ...................... B64G 9/00 138/119 |
| 4,459,753 A | * | 7/1984 | Nagasawa ................ B29C 70/50 33/701 |
| 7,062,862 B2 | * | 6/2006 | Wheaton ............... G01B 3/1082 33/757 |
| 7,444,759 B1 | * | 11/2008 | Fleming ................ G01B 3/1082 33/755 |
| 7,490,414 B2 | | 2/2009 | Critelli et al. |
| 7,730,630 B1 | | 6/2010 | Lamb et al. |
| 7,856,735 B2 | * | 12/2010 | Allezy ................. B29C 61/0616 33/755 |
| 7,987,611 B2 | | 8/2011 | Taylor |

(Continued)

FOREIGN PATENT DOCUMENTS

| | | | | |
|---|---|---|---|---|
| EP | 0100138 A2 | * | 2/1984 | ............ B29C 70/083 |
| GB | 2048165 A | * | 12/1980 | ............ B29C 70/083 |

OTHER PUBLICATIONS

PCT Search Report and Written Opinion mailed Jul. 8, 2015 for PCT application No. PCT/US2015/023969, 9 pages.

(Continued)

*Primary Examiner* — Christopher Fulton
(74) *Attorney, Agent, or Firm* — Lee & Hayes, PLLC

(57) ABSTRACT

An apparatus including a housing having a housing aperture, a spring biased retracting reel located within the housing, and an elongated member that includes a first end attached to the spring biased retracting reel and having a second distal end outside of the housing. The elongated member capable of winding upon the spring biased retracting reel while translating through the housing aperture, where the elongate member further includes an interior chamber defined by an uncoupled region between a first and a second arcuate elongate members and a venting mechanism capable of regulating air flowing in and out of the interior chamber. Each of the first and second arcuate elongate members further include at least a first layer of fiber material and a second layer of fiber material, where a majority of fibers in the first layer of fiber material are oriented substantially perpendicular to a majority of fibers in the second layer of fiber material.

20 Claims, 14 Drawing Sheets

(56) References Cited

U.S. PATENT DOCUMENTS 8,033,033 B2 10/2011 Lamb et al.
2010/0024234 A1* 2/2010 Taylor .................. G01B 3/1041
33/757

OTHER PUBLICATIONS

Herbeck, L. "Development and Test of Deployable Ultra-Lightweight CFRP-Booms for a Solar Sail", Institute of Structural Mechanics, German Aerospace Center (DLR), Brunswick, Germany, published on Jan. 2000 [online][retrieved on Apr. 2, 2014] retrieved from: http://www.dlr.de/fa/Portaldata/17/Resources/dokumente/institut/2000/2000_01.pdf, 6pps.

Penjuri, Vyk "Simulation and Testing of Deployable CFRP Booms for Large Space Structures" Lulea University of Technology, Department of Computer Science, Electrical and Space Engineering, Masters Thesis published on Aug. 2011, Lulea Sweden [online] [retrieved on Apr. 2, 2014] retrieved from: http://pure.ltu.se/portal/files/34388327/LTU-EX-2011-34324181.pdf_, 118 pps.

Sickinger, C. "Lightweight Deployable Booms: Design, Manufacture, Verification, and Smart Materials Application" Institute of Structural Mechanics, German Aerospace Center (DLR e. V.), Brunswick, Germany, $55^{th}$ International Astronomical Congress, IAF/IAA/IISL, Vancouver Canada, Oct. 4-8, 2004 [online][retrieved on Apr. 2, 2014] retrieved from: http://www.dlr.de/fa/Portaldata/17/Resources/dokumente/institut/2004/2004_04.pdf, 11 pps.

* cited by examiner

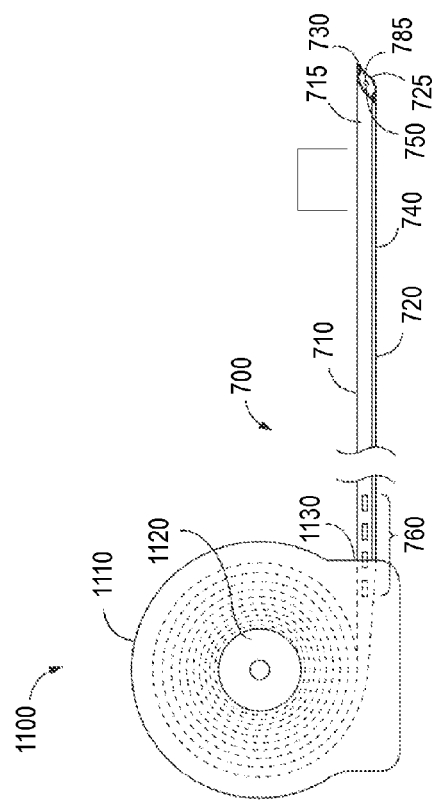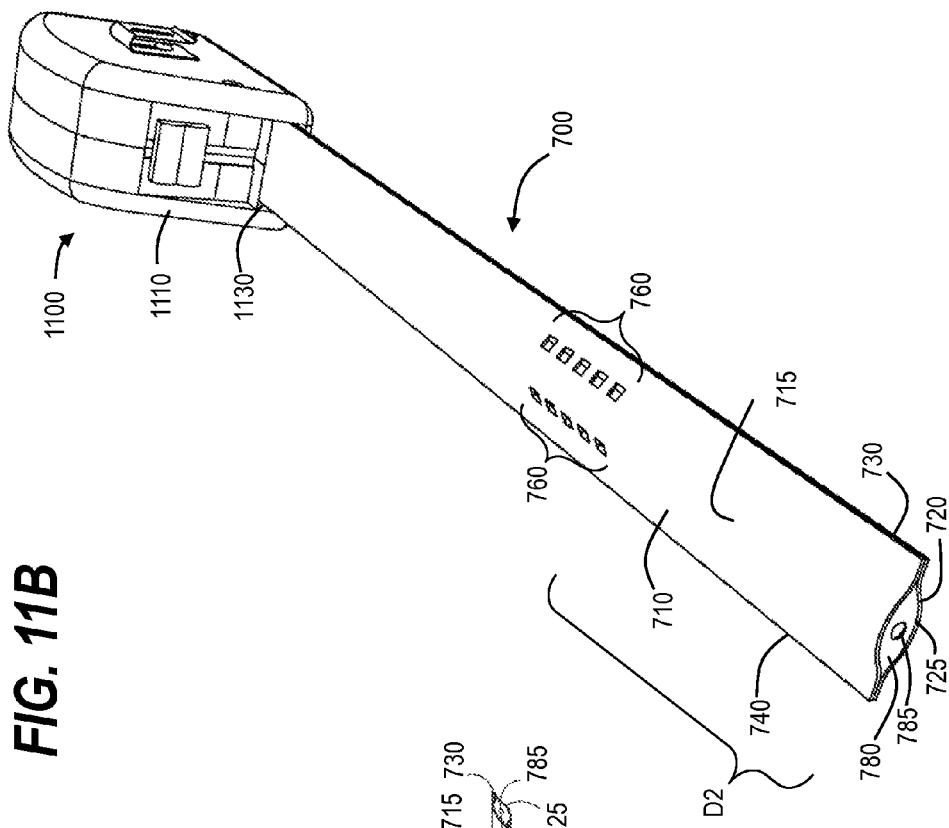
*FIG. 11A*
*FIG. 11B*

SELF-SUPPORTING COLLAPSIBLE AND RETRACTABLE ELONGATE MEMBER AND METHOD OF RETRACTING

TECHNICAL FIELD OF THE INVENTION

The technology disclosed herein generally relates to a self-supporting elongate member, more particularly to a self-supporting elongate member that collapses when the elongate member is retracted into a wound or coiled configuration.

BACKGROUND

Self-supporting collapsible elongate member may be typically used in a variety of areas of technology and may be used, for example, in devices such as tape measures. When extended, the elongate member may be generally self-supporting from one end in a horizontal direction up to a particular maximum stand-out length, at which point the elongate member will generally collapse. When flattened, the elongate member may be folded or reeled for storage. The technological limitations associated with such collapsible elongate members are generally related to the stand-out length of the elongate member, the weight of the elongate member, the size of the collapsed elongate member, the minimum bending radius of the elongate member and the durability of the elongate member over its lifetime of collapsing and extending.

Some known types of self-supporting collapsible elongate members are constructed of two relatively thin elongate strips of a material that are joined at their longitudinal edges to form flanges with an enclosed tube-like structural region between them. Typically, each of the elongate strips may be constructed of a metal material and the elongate strips are joined through welding. Typically the elongate strips have complimentary curved profiles to increase the stand-out length of the elongate member. When these types of elongate members are collapsed, they are typically flattened and reeled onto a spool. Forces on the joints between the elongate strips may be damaging to the elongate member, particularly when welding of the edges of the elongate strips may render the joints of the elongate member relatively brittle. Reeling of the elongate member may cause buckling of at least one of the elongate strips, which may reduce the compactness of the collapsed elongate member. Furthermore, the stresses on the elongate member from its reeling may compound with the stresses on the elongate member from its flattening, which may contribute to the degradation of the elongate member.

It is with respect to these and other considerations that the disclosure herein is presented.

SUMMARY OF THE INVENTION

It should be appreciated that this Summary is provided to introduce a selection of concepts in a simplified form that are further described below in the Detailed Description. This Summary is not intended to be used to limit the scope of the claimed subject matter.

In one embodiment disclosed herein, an apparatus including an elongate member including a first arcuate elongate member having first member longitudinal edges, and a second arcuate elongate member having second member longitudinal edges joined at the first member longitudinal edges to define an interior chamber defined by an uncoupled region between the first and second arcuate elongate members. Each of the first and second arcuate elongate members further include at least a first layer of fiber material and a second layer of fiber material, where a majority of fibers in the first layer of fiber material are oriented substantially perpendicular to a majority of fibers in the second layer of fiber material.

In another embodiment disclosed herein, an apparatus including a housing having a housing aperture, a spring biased retracting reel located within the housing, and an elongated member having a first end attached to the spring biased retracting reel and having a second distal end outside of the housing. The elongated member further being capable of winding upon the spring biased retracting reel while translating through the housing aperture, the elongate member further having an interior chamber and a venting mechanism capable of regulating air flowing in and out of the interior chamber.

In another embodiment disclosed herein, a method of retracting an elongated member that provides an elongate member attached at a first end to a retracting reel. The elongate member includes an interior chamber and a venting mechanism that regulates air flowing in and out of the interior chamber. The retracting reel may be rotated in a direction to cause the elongate member to be wound upon the retracting reel. The interior chamber of the elongate member may be collapsed as the elongate member is wound upon the retracting reel. The interior chamber of the elongate member expels air through the venting mechanism of the elongate member, and thereby regulates a retracting velocity of the retracting reel when winding the elongate member upon the retracting reel based on the venting mechanism of the elongate member.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIG. 11A illustrates a side schematic view of a representative configuration of the elongate member within a housing reel;

FIG. 11B illustrates a perspective view of a representative configuration of the elongate member within the housing reel of FIG. 11A;

The configurations presented herein may be more completely understood and appreciated in consideration of the following detailed description in connection with the accompanying drawings.

DETAILED DESCRIPTION

Figure 1:
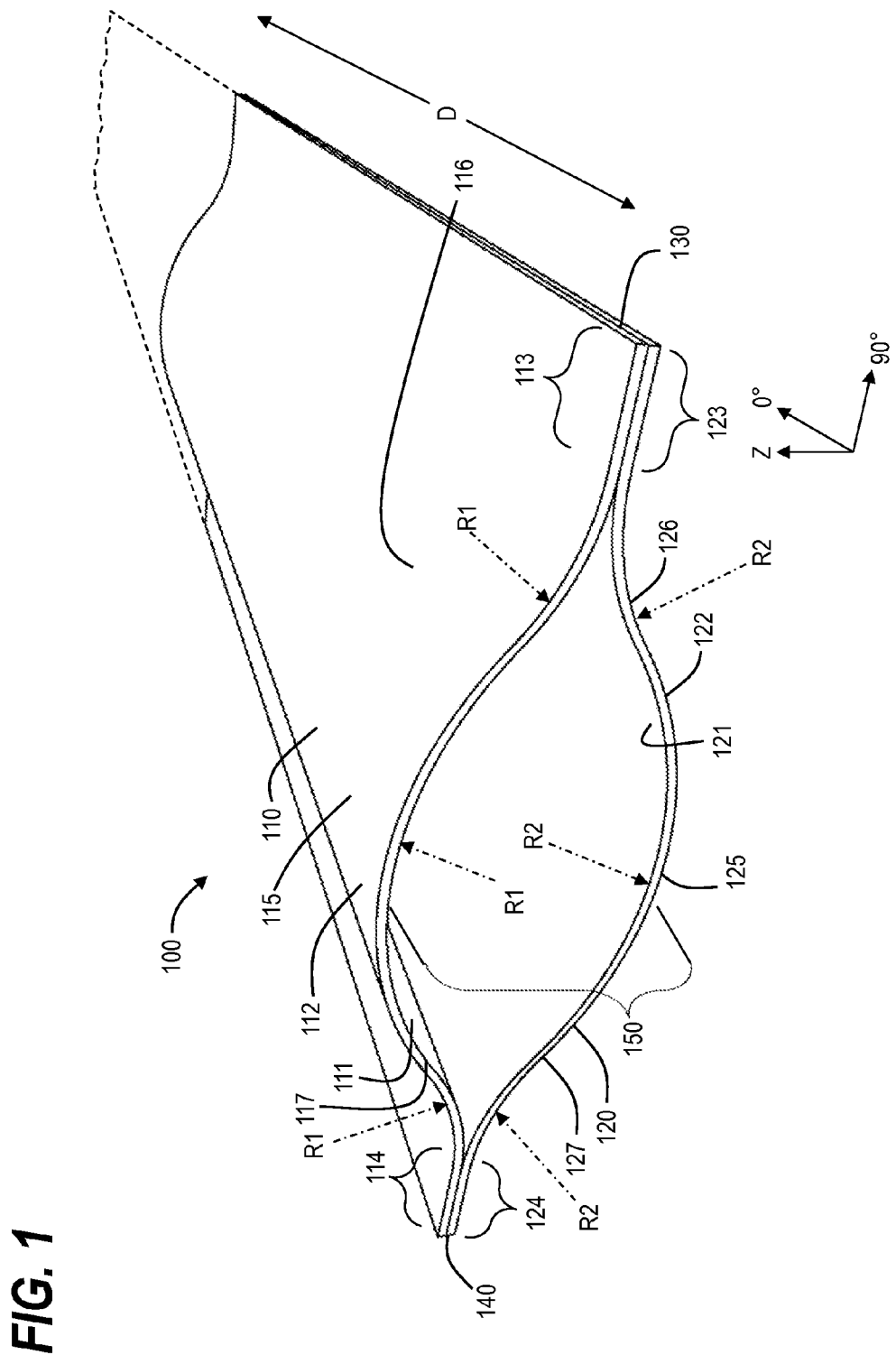
FIG. 1 illustrates a perspective view of a portion of one configuration of an elongate member.

FIG. 1 illustrates a perspective view of a portion of one configuration of an elongate member 100 generally having a first elongate strip 110 and a second elongate strip 120 that cooperatively define a first elongate member edge 130, a second elongate member edge 140, and an elongate member uncoupled region 150 of the elongate member 100. The elongate member 100 generally extends in the longitudinal direction D1 for some distance so as to be substantially greater in length than width, but is illustrated in FIG. 1 as a shortened segment for simplicity in the figures. For the present disclosure, the longitudinal direction D1 may be generally parallel with the 0° axis, and the lateral direction may be generally parallel with the 90° axis, and the Z-axis may be perpendicular to the 0°-90° plane, as depicted in FIG. 1.

The first elongate strip 110 generally has a first elongate strip inner surface 111, a first elongate strip outer surface 112 that may be opposite the first elongate strip inner surface 111, a first elongate strip first edge region 113 and a first elongate strip second edge region 114. The second elongate strip 120 generally has a second inner surface 121, a second elongate strip outer surface 122 opposite the second inner surface 121, a second elongate strip first edge region 123 and a second elongate strip second edge region 124.

The first elongate strip first edge region 113 may be rigidly coupled to the second elongate strip first edge region 123 to form a first elongate member edge 130 of the elongate member 100. The first elongate strip second edge region 114 may be rigidly coupled to a second elongate strip second edge region 124 to form a second elongate member edge 140 of the elongate member 100.

The first elongate strip inner surface 111 of the first elongate strip 110 may be adjacent to a second elongate strip inner surface 121 of the second elongate strip 120. The elongate member uncoupled region 150 may be defined between the first elongate strip inner surface 111, the second inner surface 121, the first elongate member edge 130 and the second elongate edge 140.

The first 130 and second 140 elongate edges of the elongate member 100 are generally parallel and coplanar. The corresponding elongate edge regions 113, 114, 123 and 124 of the first 110 and second 120 elongate strips are generally parallel to the first and second elongate edges 130, 140. In a variety of configurations, including the one depicted, the first elongate strip 110 has a cross-sectional profile that may be substantially similar to the cross-sectional profile of the second elongate strip 120. In such configurations, the first elongate member edge 130 and the second elongate member edge 140 of the elongate member 100 defines a plane of symmetry between the first elongate strip 110 and the second elongate strip 120.

The first elongate strip 110 generally defines a first elongate strip peak 115 between the first elongate member edge 130 and the second elongate edge 140. The first elongate strip 110 also defines a first elongate strip first transition region 116 between the first elongate member edge 130 and the first peak 115, and a first elongate strip second transition region 117 between the first elongate strip peak 115 and the second elongate edge 140.

Similarly, the second elongate strip 120 generally defines a second elongate strip peak 125 between the first elongate member edge 130 and the second elongate edge 140. The second elongate strip 120 also defines a second elongate strip first transition region 116 between the first elongate member edge 130 and the second elongate strip peak 125 and a second elongate strip second transition region 127 between the second elongate strip peak 125 and the second elongate edge 140.

In a variety of configurations, the radii R1 of the first peak 115, the first elongate strip first transition region 116, and the first elongate strip second transition region 117 are substantially equal. In a variety of configurations, the radii R2 of the second peak 125, the second elongate strip first transition region 126 and second elongate strip second transition region 127 are substantially equal. In at least one configuration, the radii R1 and R2 of the first elongate strip peak 115 and the second elongate strip peak 125 are substantially equal.

The elongate member 100 may be constructed of a variety of materials, as will be described herein. Generally the first elongate strip 110 and the second elongate strip 120 are constructed such that the elongate member 100 be self-supporting for a stand-out distance in the direction of the 0° axis, and allow the first peak 115, the second peak 125, and the corresponding transition regions 116, 117, 126, and 127 to flatten in response to sufficient external forces, which will be described with respect to FIG. 12A, below.

The first elongate strip first edge region 113 and first elongate strip second edge region 114 of the first elongate strip 110 may be rigidly coupled corresponding to the second elongate strip first edge region 123 and second elongate strip second edge region 124 of the second elongate strip 120 through a variety of means. In at least one configuration, the elongate edge regions 113, 114, 123 and 124 are coupled through the use of an adhering substance, such a matrix material. The matrix material may be a resin, for example, an epoxy resin or a thermoplastic resin. Other adhesives may be used that are known in the art. In a variety of configurations, the first 130 and second 140 elongate member edges may be reinforced through the use of carbon fiber tape and/or carbon fiber nanotubes.

In a variety of other configurations the first elongate strip 110 and the second elongate strip 120 may each be constructed of a fabric material. Many types of fabrics are contemplated, and, at some configurations, the fabric may be a woven fiber material. In such configurations, the fabric may be a bi-axial weave having two strand directions, such as the longitudinal direction and the lateral direction. Other types of weaves may also be used. In a variety of configurations, the woven fiber may be a composite of fibers and a matrix material. In a variety of other configurations, the fabric may be a composite that may be constructed of layers of substantially unidirectional fibers in a matrix material, which will be described in more detail with respect to FIGS. 2-5 as described below. In one configuration the fabric may be a combination of woven fabrics and substantially unidirectional fiber layers.

Figure 2:
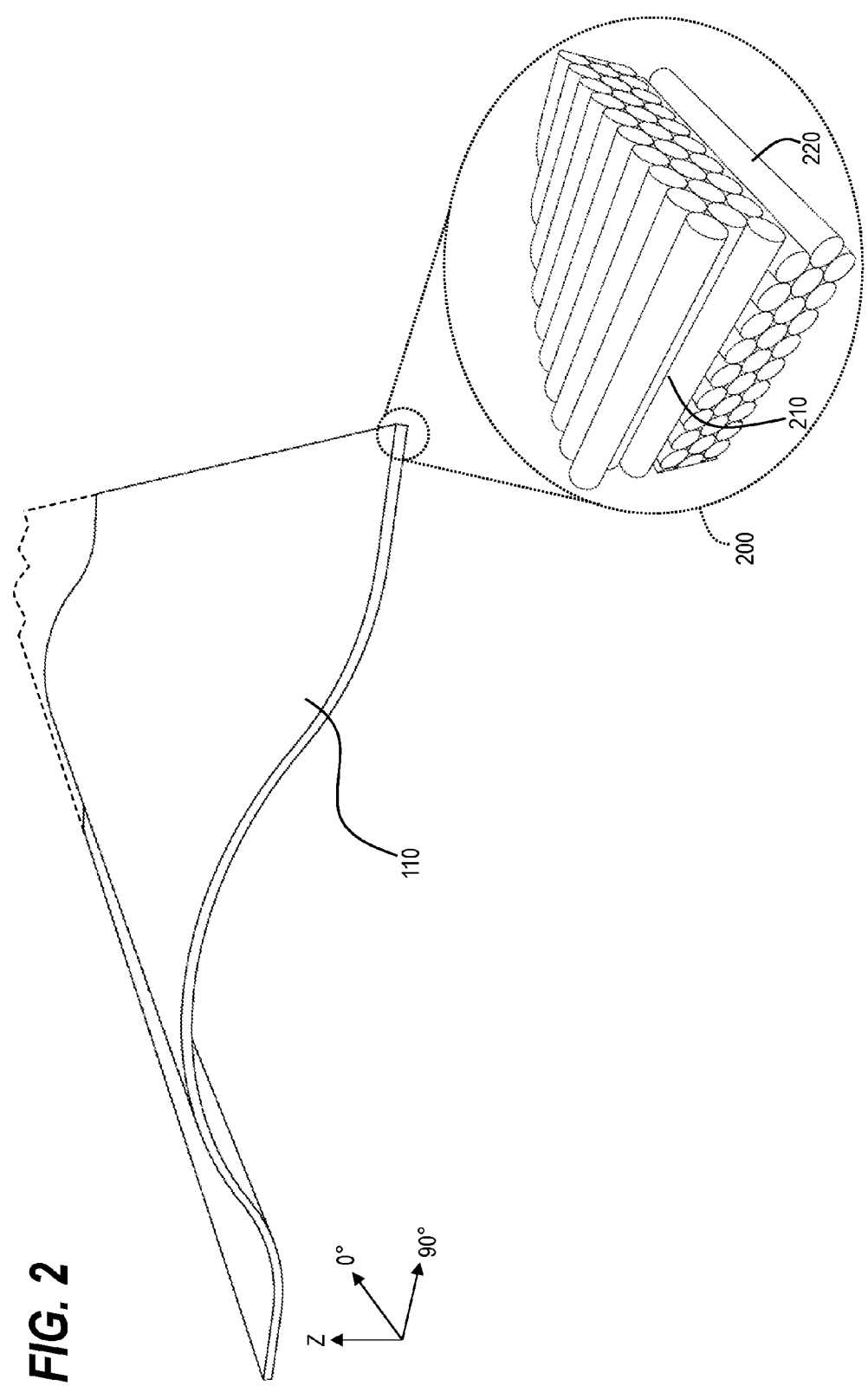
FIG. 2 illustrates a perspective view of a representative portion of an element of an elongate member of the configuration of FIG. 1.

FIG. 2 illustrates a perspective view of a representative portion of the first elongate strip 110 of the elongate member 100 of the configuration of FIG. 1. A blow-up 200 of an edge portion of the elongate member 100 illustrates one configuration of the construction of the first 110 and second 120 elongate strips having two sandwiched layers of a first layer of fibrous material 210 and a second layer of second fibrous 220. A first layer of fibrous material 210 is oriented in a direction generally parallel to the 90° axis, or transverse to the major longitudinal axis of the first elongate strip 110 of elongate member 100. The first layer of fibrous material 210 may include multiple layers of fibers arranged in either contiguous layers, as depicted in FIG. 2, or in a substantially amorphous configuration where the fibers lack any discrete layering. However, in either configuration, the direction of the fibers are substantially uniform with respect to one another, and in this example, are generally parallel to the 90° axis of the first elongate strip 110 of elongate member 100.

A second layer of fibrous material 220 is oriented in a direction generally parallel to the 0° axis, or contiguous with the major longitudinal axis of the first elongate strip 110 of elongate member 100. The second layer of fibrous material 220 may include multiple layers of fibers arranged in either contiguous layers, as depicted in FIG. 2, or in a substantially amorphous configuration where the fibers lack any discrete layering. However, in either configuration, the direction of the fibers are substantially uniform with respect to one another, and in this example, are generally parallel to the 0° axis of the first elongate strip 110 of elongate member 100.

One feature of the first elongate strip 110 as illustrated by FIG. 2, representative also of the second elongate strip 120 of FIG. 1, the elongate strip 110 has at least two layers of fibrous material being oriented substantially perpendicular to each other. That is, where one layer is substantially parallel to the major longitudinal axis of the elongate member 100, the other corresponding layer is substantially perpendicular to the major longitudinal axis of the elongate member 100. More than two fibrous layers may be used for each elongate strip 110 and 120, and other layers may be oriented in directions other than substantially perpendicular and parallel to the major longitudinal axis of the elongate member 100.

Figure 3:
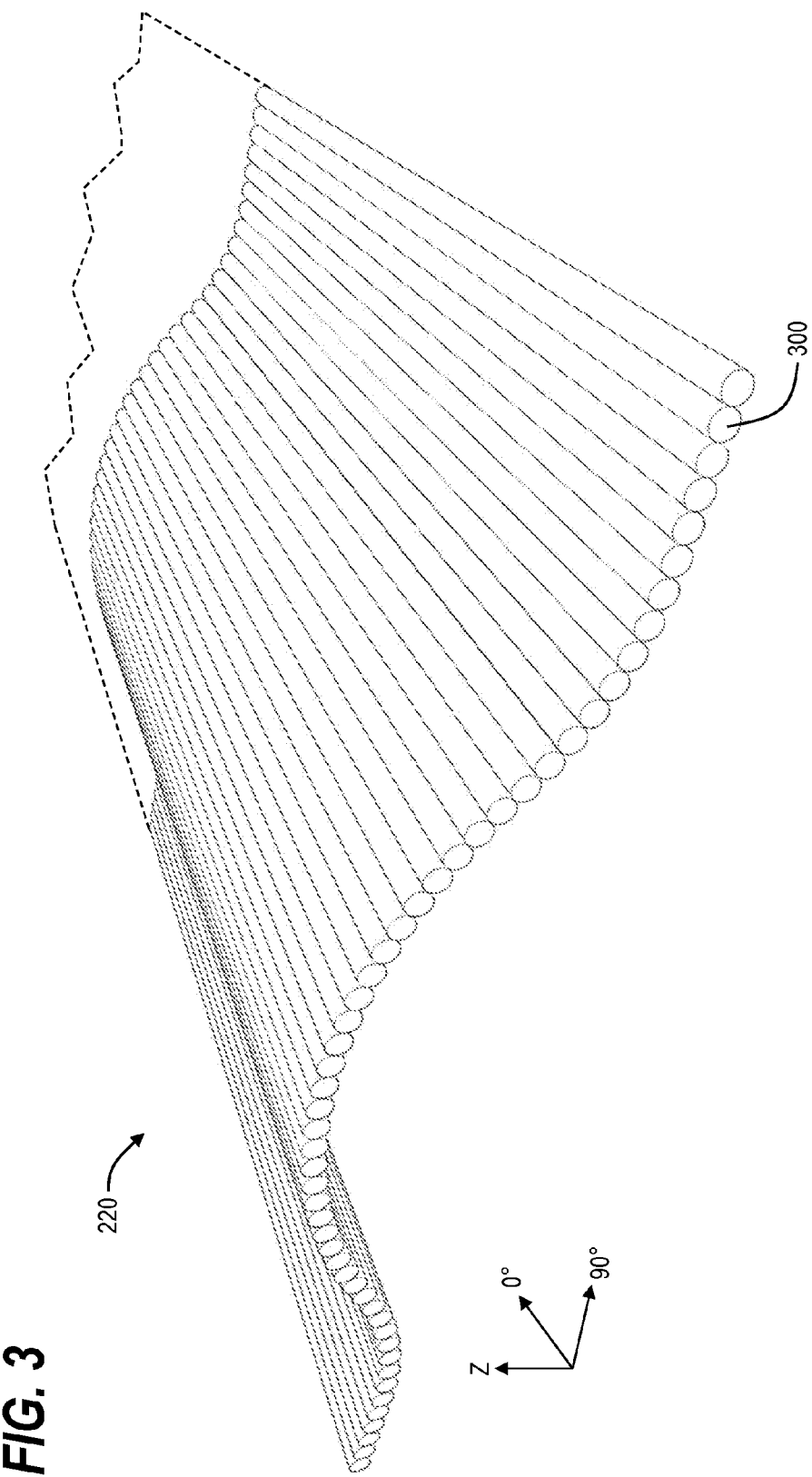
FIG. 3 illustrates a perspective view of a representative portion of an element of an elongate member of the configuration of FIG. 2.

FIG. 3 illustrates an exemplary longitudinal fibrous layer 300 corresponding to the second layer of fibrous material 220 of FIG. 2 and illustrated in simplified manner showing only a single layer of fibrous material extending in a direction generally parallel to the 0° axis, or contiguous with the major longitudinal axis of the first elongate strip 110 of elongate member 100.

Figure 4:
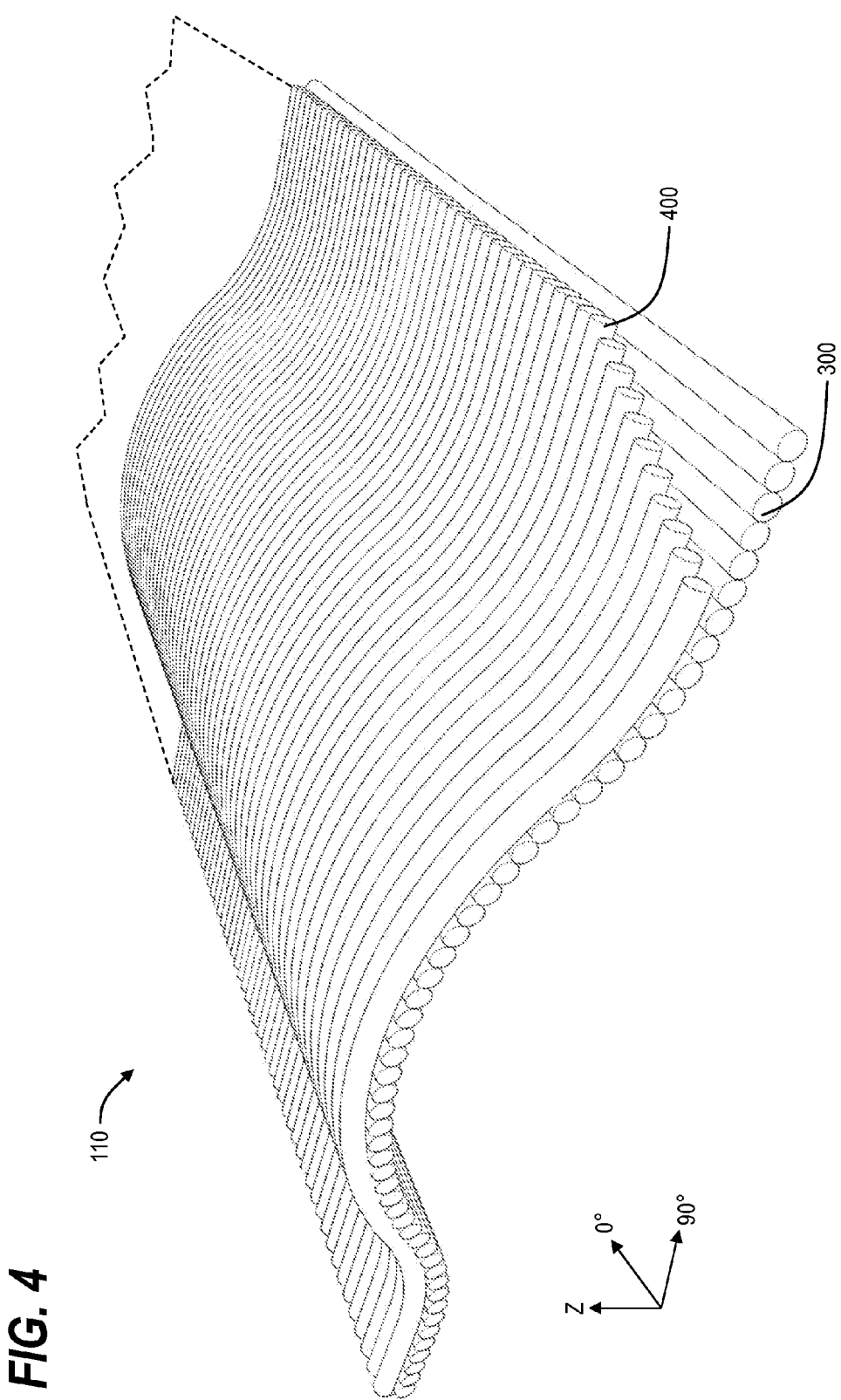
FIG. 4 illustrates a perspective view of a representative portion of an element of an elongate member of the configuration of FIG. 2.

FIG. 4 illustrates the representative first elongate strip 110 with an exemplary transverse fibrous layer 400 corresponding to the first layer of fibrous material 210 of FIG. 2 in conjunction with the longitudinal fibrous layer 300 of FIG. 3. The transverse fibrous layer 400 is illustrated in simplified manner showing only a single layer of fibrous material extending in a direction generally parallel to the 90° axis, or perpendicular to the major longitudinal axis of the first elongate strip 110 of elongate member 100.

Figure 5:
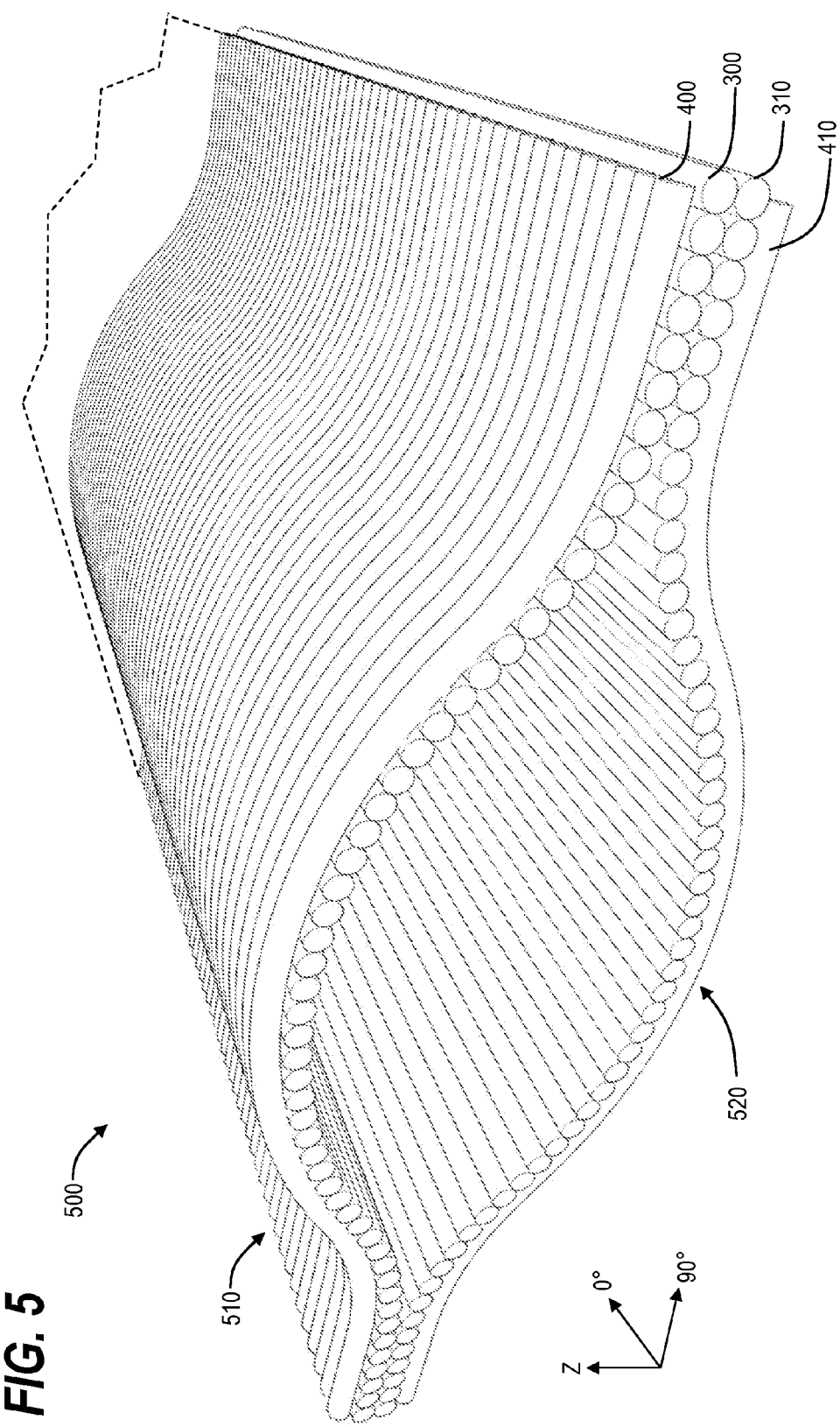
FIG. 5 illustrates a perspective view of a representative portion of the elongate member of the configuration of FIG. 1.

FIG. 5 illustrates an elongate member 500, similar to the elongate member 100 illustrated in FIG. 1, being a combination of a first elongate strip 510 including the longitudinal fibrous layer 300 of FIG. 3 and the transverse fibrous layer 400 of FIG. 4, and a second elongate strip 520 including a second longitudinal fibrous layer 310 similar to the longitudinal fibrous layer 300 of FIG. 3, and a second transverse fibrous layer 410 similar to the transverse fibrous layer 400 of FIG. 4. The first elongate strip 510 may represent the first elongate strip 110 of FIG. 1, and the second elongate strip 520 may represent the second elongate strip 120 of FIG. 1. The first elongate strip 510 may be constructed of two layers of substantially unidirectional fibers. The longitudinal fibrous layer 300, which may be an inner layer, of a substantially unidirectional fiber has a plurality of fibers that are oriented to extend in the longitudinal direction. The transverse fibrous layer 400, which may be the outer layer, of substantially unidirectional fibers has a plurality of fibers that are oriented to extend in the lateral direction. Similarly, the second elongate strip 520 may be constructed of two layers of substantially unidirectional fiber, with the second longitudinal fibrous layer 310 being oriented in the longitudinal direction, and the second transverse fibrous layer 410 being oriented in the lateral direction. In a variety of configurations the fibers may be carbon fibers, and in at least one configuration, the fibers may be carbon fibers supplemented with carbon nanotubes. In some configurations, each layer may be a composite of fibers in a resin, such as an epoxy resin or a thermoplastic polymer resin, such as nylon-6 configuration.

Whether the fabric of the elongate strips has a woven fiber construction or may be constructed of layers of substantially unidirectional fiber, or both, the fiber may be a variety of materials. In a variety of configurations the fiber may be a carbon fiber or an aramid fiber. In some configurations, the fiber material may be a spun liquid crystal polymer. In some configurations, the fiber material may be glass fiber or natural occurring fiber. Other types of fibers and combinations of fibers may be used in construction of the first elongate strip and the second elongate strip.

The fabric of the first elongate strip and the second elongate strip may be a woven fiber or substantially unidirectional fiber and matrix material composite, the matrix may be a variety of materials. In a variety of configurations, the matrix material may be a metal or resin material. In configurations where the matrix material may be a resin, the resin may be an epoxy resin or a thermoplastic resin. Other types of matrix materials are also contemplated, which will be appreciated by those having skill in the art.

Figure 6:
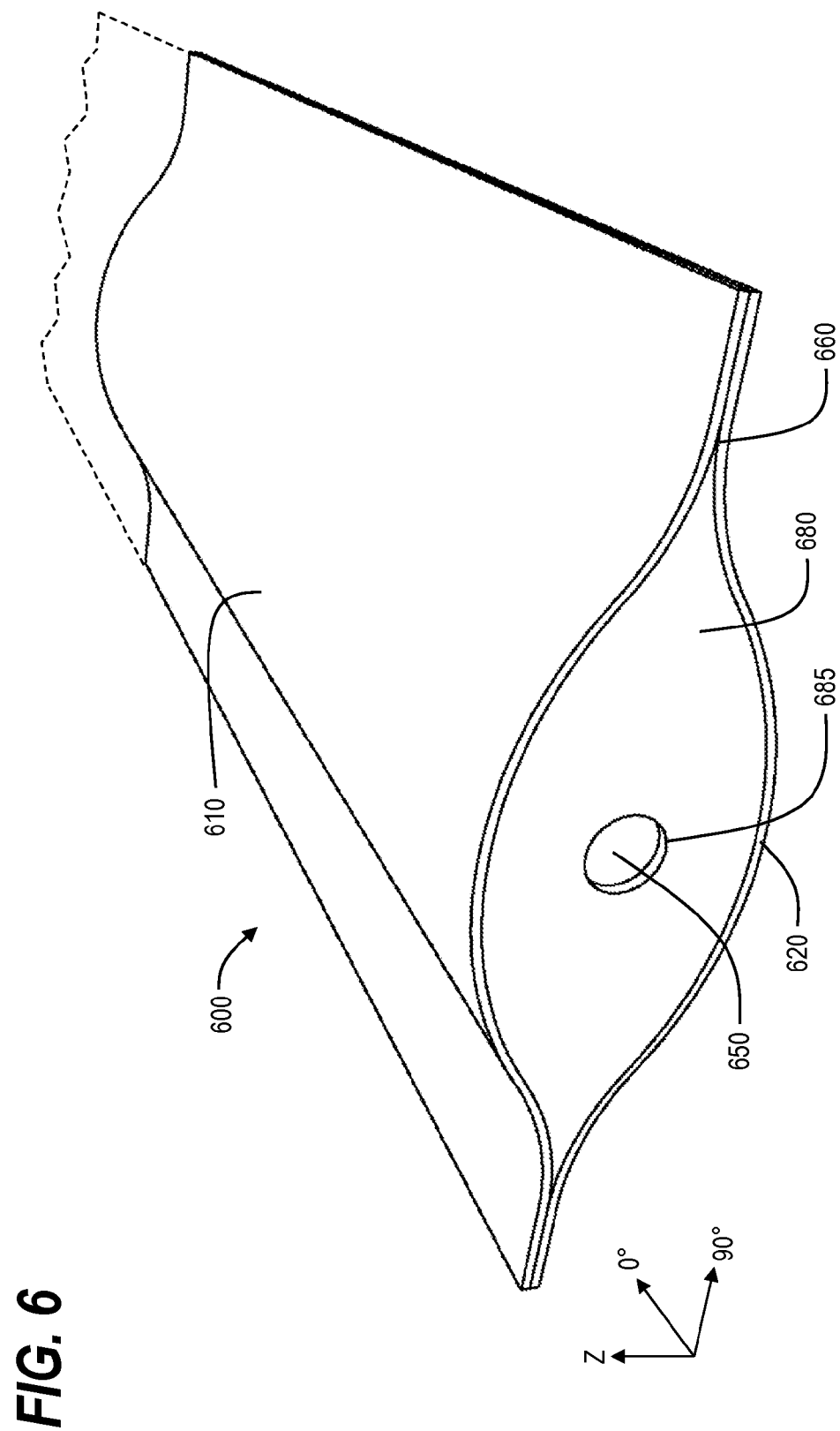
FIG. 6 illustrates a perspective view of a representative portion of another configuration of an elongate member similar to FIG. 1.

FIG. 6 illustrates a perspective view of a representative portion of another configuration of an elongate member 600 similar to the elongate member 100 illustrated in FIG. 1. The elongate member 600 includes a first elongate strip 610, similar to the first elongate strip 110 of FIG. 1, and a second elongate strip 620, similar to the second elongate strip 120 of FIG. 1. An elongate member end member 680 may be disposed towards a elongate member distal end 660 of the elongate member 600 proximate an uncoupled region 650, (similar to the elongate member uncoupled region 150 of FIG. 1), between the first elongate strip 610 and the second elongate strip 620. An end member aperture 685 may be disposed within an elongate member end member 680 at the elongate member distal end 660 of the elongate member 600 and may be configured to limit the rate of expulsion of air from the uncoupled region between the first and second elongate strips 610 and 620 as the elongate member 600 is collapsed. Thus, a maximum speed at which the elongate member 600 may be collapsed, for example, by reeling it upon itself shown below in FIG. 11A, may be limited by such an end member aperture 685.

Figure 7:
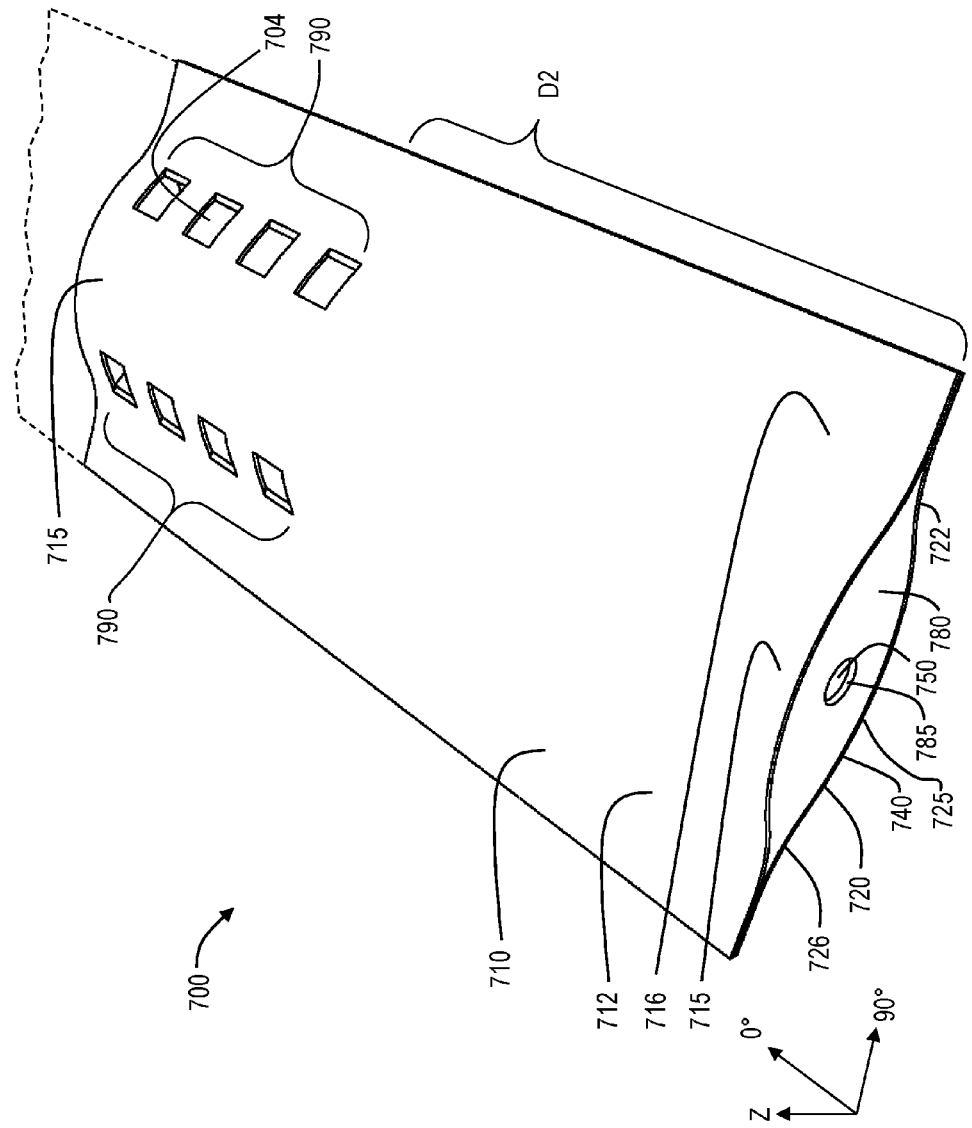
FIG. 7 illustrates a perspective view of a representative portion of a configuration of an elongate member of FIG. 6.

FIG. 7 illustrates a perspective view of a representative portion of a configuration of an elongate member 700 similar to the elongate member of FIG. 6. The elongate member 700 includes a first elongate strip 710, similar to the first elongate strip 110 of FIG. 1, and a second elongate strip 720, similar to the second elongate strip 120 of FIG. 1. An elongate member end member 780 may be disposed towards an elongate member distal end 760 of the elongate member 700 proximate an uncoupled region 750 defining an interior chamber 704, (similar to the elongate member uncoupled region 150 of FIG. 1), between the first elongate strip 710 and the second elongate strip 720. An end member aperture 785 may be disposed within the elongate member end member 780 at the elongate member distal end 760 of the elongate member 700 and may be configured to limit the rate of expulsion of air from the uncoupled region 750 between the first and second elongate strips 710 and 720 as the elongate member 700 is collapsed, similar to FIG. 6. In addition to the end member aperture 785 used to limit the rate of expulsion of air from the uncoupled region 750 of the elongate member 700, elongate member series of apertures 790 may be incorporated into either one or both of the elongate strips 710 (shown) and 720 (not shown), and may be either a single row of apertures (not shown), or a plurality of rows of apertures (shown). Additionally, the elongate member series of apertures 790 may be located anywhere proximate the uncoupled region 750 (similar to the elongate member uncoupled region 150 of FIG. 1) between the first and second elongated strips 710 and 720. In FIG. 7, for example, the two elongate member series of apertures 790 are located on either side of the first elongate strip peak 715 of the first elongate member 710.

The elongate member series of apertures 790 may be located a distance D2 from the elongate member distal end 760 to enable air within the uncoupled region 750 between the first and second elongated strips 710 and 720 to bypass the air valve 750 and be expelled from the uncoupled region 750 through the elongate member series of apertures 790. When the elongate member series of apertures 790 are located a distance D2 from the elongate member distal end 760, the increased cross sectional areas of the elongate member series of apertures 790 allow more air between the uncoupled region 750 of the first and second elongate strips 710 and 720 to be expelled from the elongate member as the first and second elongate strips are collapsed together, for example, during a reeling process where the elongate member 700 is rotationally wound upon itself. When the collapsing of the first and second elongate strips 710 and 720 continues past the elongate member series of apertures 790 in a direction of towards the elongate member distal end 760, the elongate member series of apertures 790 no longer allow for air between the first and second elongate strips 710 and 720 to be expelled therethrough, and all air between the first and second elongate strips 710 and 720 must be expelled through the smaller cross-sectional area end member aperture 785. This reduction in airflow creates a larger collapsing resistance based on the reduced capacity of air-flow through the end member aperture 785 from the uncoupled region 750 between the first and second elongate strips 710 and 720. This feature of increased resistance allows for the elongate member 700 to increase a collapsing resistance between the first and second elongate strips 710 and 720 when the collapsing (or reeling) process proceeds past the elongate member series of apertures 790 toward the direction of the elongate member distal end 760. Such a configuration may be desirable when the elongate member 700 may be substantially extended from a reel housing, (shown in FIGS. 11A-11B), to allow for relatively faster reeling of the elongate member 700 around a reel for a predetermined length of the elongate member 700 in conjunction with a braking process during reeling when collapsing the first and second elongate strips 710 and 720 proceeds past the elongate member series of apertures 790 on the elongate member 700 in the direction towards the elongate member distal end 760.

In a variety of configurations the elongate member series of apertures 790 are defined in a position that may be offset from central to the width of the elongate member 700. In some configurations the elongate member series of apertures 790 may be laterally and longitudinally symmetrical across the elongate member 700.

Figure 8:
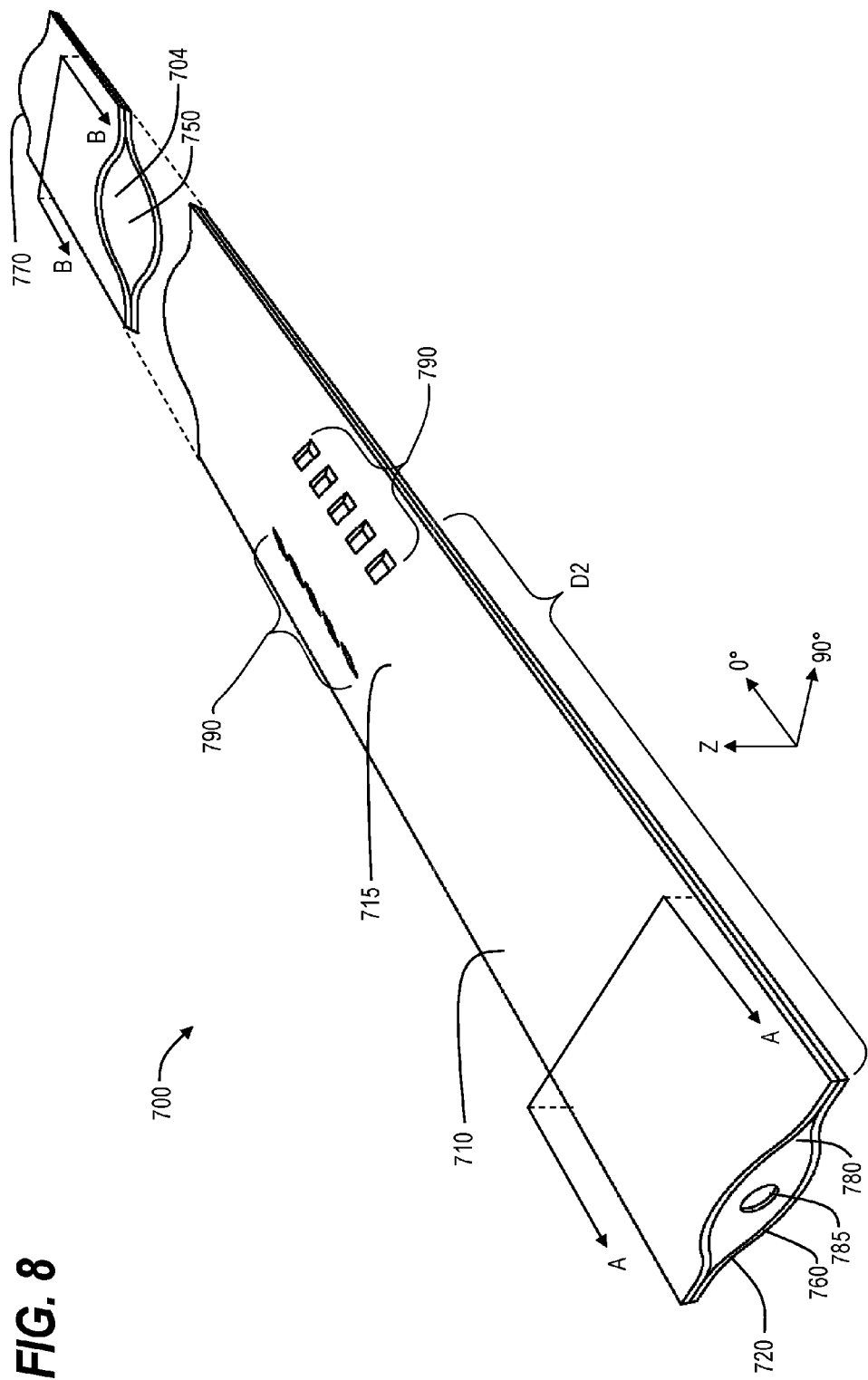
FIG. 8 illustrates a perspective view of a representative portion of a configuration of an elongate member of FIG. 7.

FIG. 8 illustrates a perspective view of a representative portion of a configuration of the elongate member of FIG. 7 including the elongate member series of apertures 790 and the end member aperture 785 on the elongate member distal end 760. Cross-sections A-A proximate the elongate member distal end 760, and B-B proximate an elongate member opposing distal end 770 of the elongate member are illustrated in FIG. 8 to represent differing configurations in the transition of thickness and transition of geometry of the elongate member 700 between the elongate member distal ends 760 and 770. These transitions are illustrated in FIGS. 9-10 and discussed below.

Figure 9:
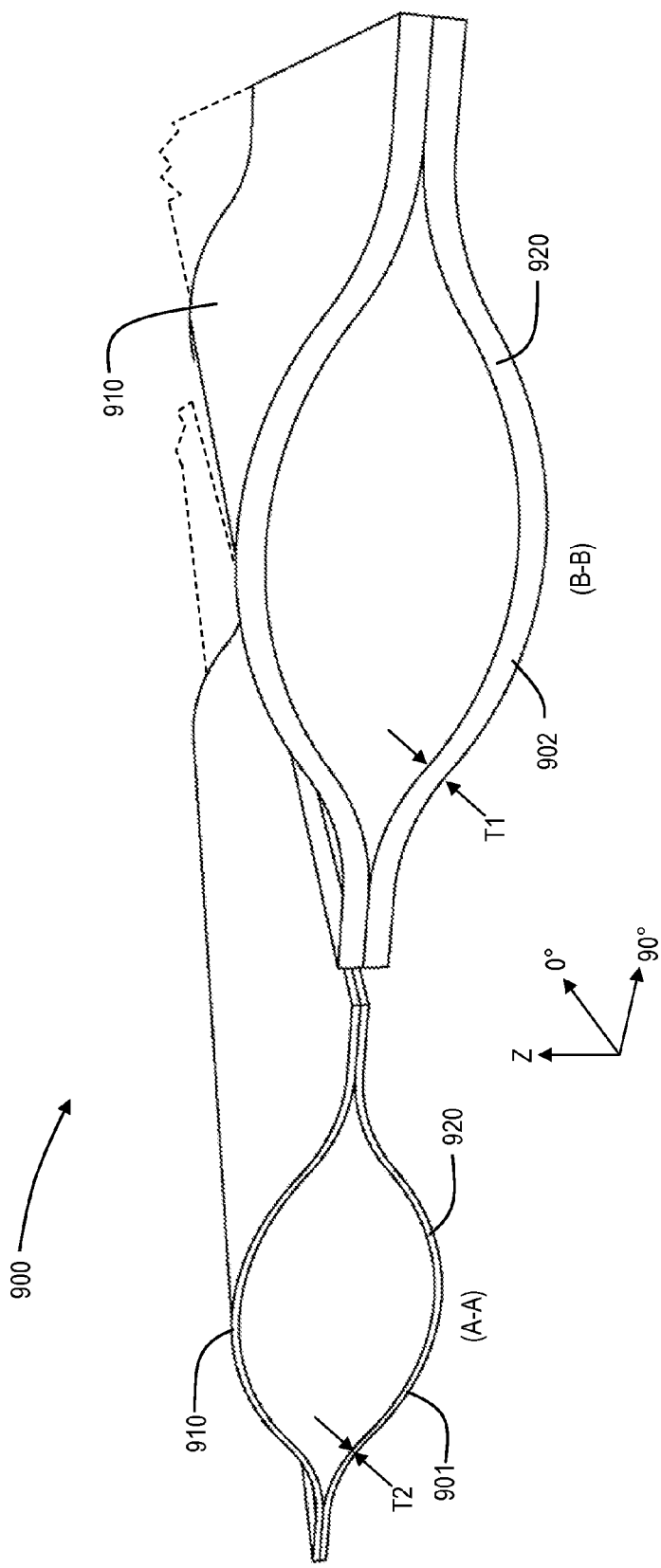
FIG. 9 illustrates a perspective view of two representative cross-sections A-A and B-B configurations of the elongate member of FIG. 8.

FIG. 9 illustrates a first configuration of a perspective view of an elongate member 900 and a representative cross-section 901 at section line (A-A) of FIG. 8, and a representative cross-section 902 at section line (B-B) of FIG. 8 illustrating a transition of a greater thickness T1 of the material in first and second elongate members 910 and 920 at the elongate member opposing distal end 770 (of FIG. 8) proximate the section line (B-B) to a lesser thickness T2 of material in the elongate members 910 and 920 proximate the elongate member distal end 760 (of FIG. 8) at section line (A-A). This configuration allows the elongate member 900 to increase a stand-off strength when the elongate member 900 is fully extended and supported only at the elongate member opposing distal end 770 (of FIG. 8) by gradually reducing the weight of the elongate member 900 in the direction of the elongate member distal end 760 (of FIG. 8), while strengthening the bending resistance of the elongate member 900 with thicker material in the direction of the elongate member opposing distal end 770 (of FIG. 8).

Figure 10:
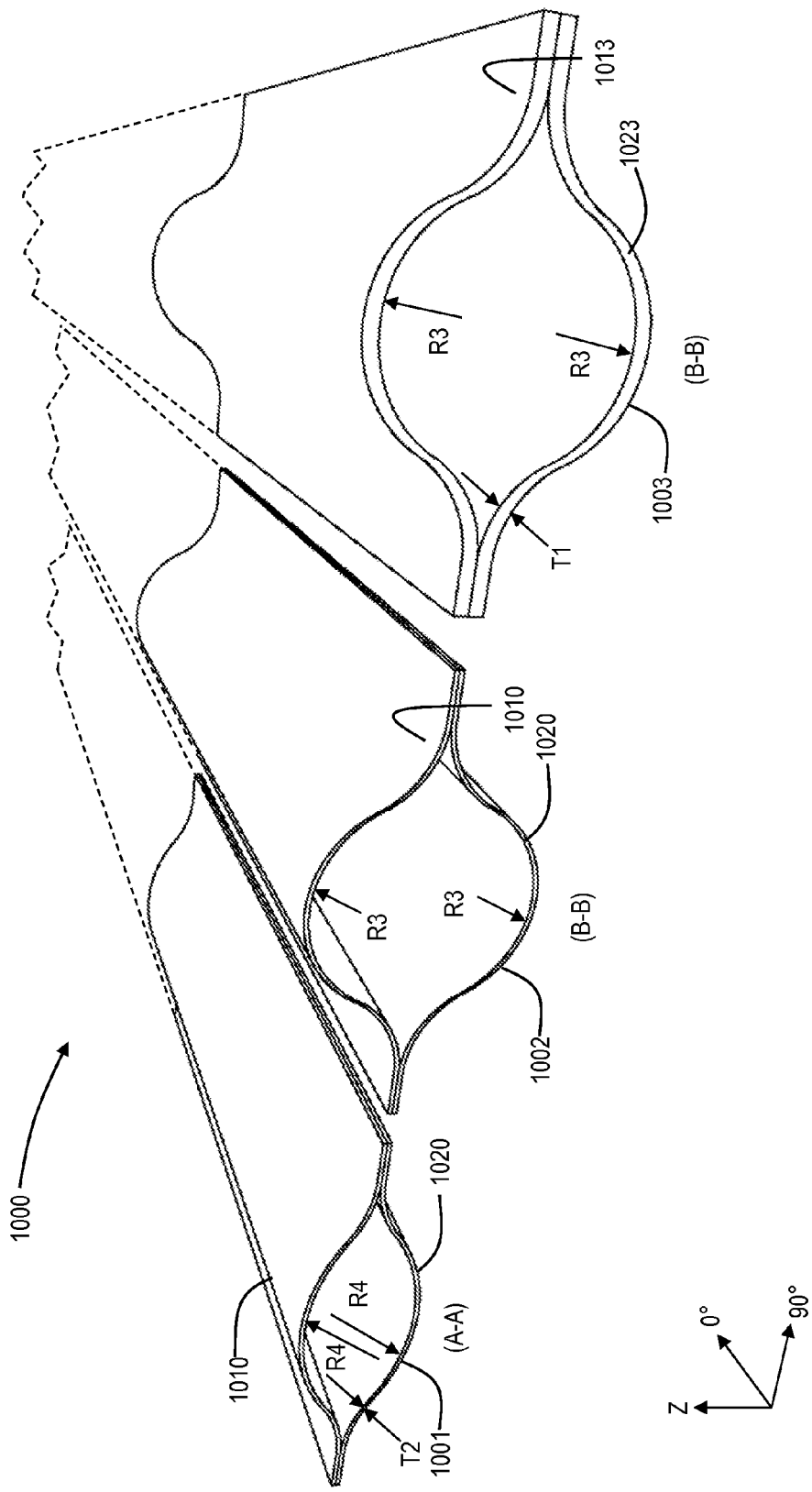
FIG. 10 illustrates a perspective view of three representative cross-sections A-A and B-B configurations of the elongate member of FIG. 8.

FIG. 10 illustrates a perspective view of another configuration of a perspective view of an elongate member 1000 and a representative cross-section 1001 at section line (A-A) of FIG. 8, and a representative cross-section 1002 at section line (B-B) of FIG. 8 illustrating a transition of a small geometric radius R3 of the material in first and second elongate members 1010 and 1020 at the elongate member opposing distal end 770 (of FIG. 8) proximate the section line (B-B), to a larger geometric radius R4 in the elongate members 1010 and 1020 at the elongate member distal end 760 (of FIG. 8) proximate the section line (A-A). The small geometric radius R3 allows more distance between the opposing peaks of each elongate strip member, while the larger geometric radius R4 allows for less distance between the opposing peaks of each elongate strip member. This configuration allows the elongate member 900 to increase a stand-off strength when the elongate member 1000 is fully extended and supported only at the elongate member opposing distal end 770 (of FIG. 8) by increasing the bending or torsional resistance of the elongate member 1000 in the direction of the elongate member opposing distal end 770, (of FIG. 8), with a smaller radius and greater distance between the peaks of each of the elongate strips 1010 and 1020 near the elongate member opposing distal end 770 where the elongate member 1000 is being supported.

FIG. 10 illustrates a perspective view of additional alternative representative cross-section 1003 at section line (B-B)

of FIG. 8 representing the combination of an increase in thickness at the representative cross-section 902 at section line (B-B) of FIG. 9, with an increase in geometric radius illustrated by cross-section 1002 at section line (B-B) of FIG. 8. Thus, the geometric first radius R3 increases and thickness T1 of material decreases in first and second elongate members 1013 and 1023 at the elongate member opposing distal end 770 of FIG. 8 in the direction toward the elongate member distal end 760 (of FIG. 8) of the elongate member 1000, i.e., the geometric radius R3 of the first and second elongate strips 1013 and 1023 would increase to the geometric radius R4 represented by the cross-section 1001 of FIG. 10, and the thickness T1 of material of the first and second elongate members 1013 and 1023 would decrease to the reduced thickness T2 represented by the cross-section 1001 of FIG. 10. The combination of both a decreasing in distance between the opposing peaks of the first and second elongate strips and a decreasing thickness of the first and second elongate strips yields a higher bending or torsional resistance at the elongate member opposing distal end 770 of FIG. 8 where the elongate member 1000 is supported from and would further increase the stand-off length of the elongate member 1000.

The reduced radius or greater distance between the opposing elongate strips towards the elongate member opposing distal end 770 may increase the stand-out distance of the elongate member 1000 by providing additional strength in response to the increased moment on the elongate strip 1000 as the elongate member distal end 660 may be extended further out. Such reduced radius or greater distance may not be desirable towards the elongate member distal end 660 of the elongate member 1000 where the increased strength may be not necessary for relatively short stand-out distances combined with the reduced collapsibility associated with the increased curvature. In addition, the increased radius or less distance between the opposing elongate strips on the elongate member distal end 660 of the elongate member 1000 requires less fabric material, which reduces the weight of the elongate member distal end 660. The increased radius or less distance also reduces stresses on the elongate member distal end 660 of the elongate strip 1000 from flattening which may improve longevity of the elongate strip over repeated use.

FIG. 11A illustrates a side schematic view of a representative configuration of the elongate member within a housing reel. The example implementation may be generally consistent with measuring tape assembly 1100 having a housing 1110, a reel 1120 disposed within the housing 1110, and defining a tape pathway opening 1130 for an elongate member 700. The reel 1120 may be generally configured to releasably wind an elongate member 700 (of FIGS. 7-8) upon itself within the housing 1110 based on a torsional spring or equivalent mechanism. The elongate strips 710, 720 of elongate member 700 are rigidly coupled along a first elongate member edge 730 and a second elongate member edge 740 of the elongate member 700, and an uncoupled region 750 may be defined between the first elongate strip 710, the second elongate strip 720, the elongate member distal end 760, the first elongate member edge 730 and the second elongate member edge 740.

Each of the first elongate strip 710 and the second elongate strip 720 define first 715 and second 725 elongate strip peaks that are configured to flatten in response to sufficient external forces. In the current configuration, sufficient external forces to flatten the peaks 715, 725 are applied when the elongate member 700 may be reeled about the reel 1120 of the measuring tape assembly 1100 and/or are provided by the housing 1110 as the elongate member 700 passes through the tape pathway opening 1130. As such, the elongate member 700 may be stored in a volume that may be a fraction of the size of the volume that would be required if the peaks 715, 725 did not flatten, which allows for a relatively smaller measuring tape housing 1110, which may be further described in relation to FIGS. 12A-12B, below.

In use, the elongate member distal end 760 may be extended, usually manually, and such extension unwinds the corresponding length of the collapsed elongate member 700 from the reel 1120. The term "distal end" 760 may be used to describe the end of the elongate member 700 that extends away from the measuring tape housing 1110 and may be opposite the elongate member opposing distal end 770, (as shown in FIG. 8), of the elongate member 700 that may be coupled to the reel 1120. As portions of the elongate member 700 exit the measuring tape housing 1110 and are no longer subject to compression forces of being reeled in the tape housing 1110, the elongate member 700 expands to its original un-flattened shape which, in the current configuration, may be consistent with FIGS. 1 and 6-8.

FIG. 11B illustrates a perspective view of a representative configuration of the elongate member within the housing reel of FIG. 11A where the distance D2 in a similar manner to FIG. 8 illustrates the elongate member series of apertures 790 located a distance D2 from the elongate member distal end 760. The increased cross sectional areas of the elongate member series of apertures 790 allow more air to be expelled between the uncoupled region 750 of the first and second elongate strips 710 and 720 from the elongate member 700 as the first and second elongate strips 710 and 720 are collapsed together, for example, during a reeling process where the elongate member 700 is rotationally wound upon itself only until the section of the elongate member 700 having the elongate member series of apertures 790 is received and collapsed within the tape housing 1110 as described above.

Figures 12A, 12B:
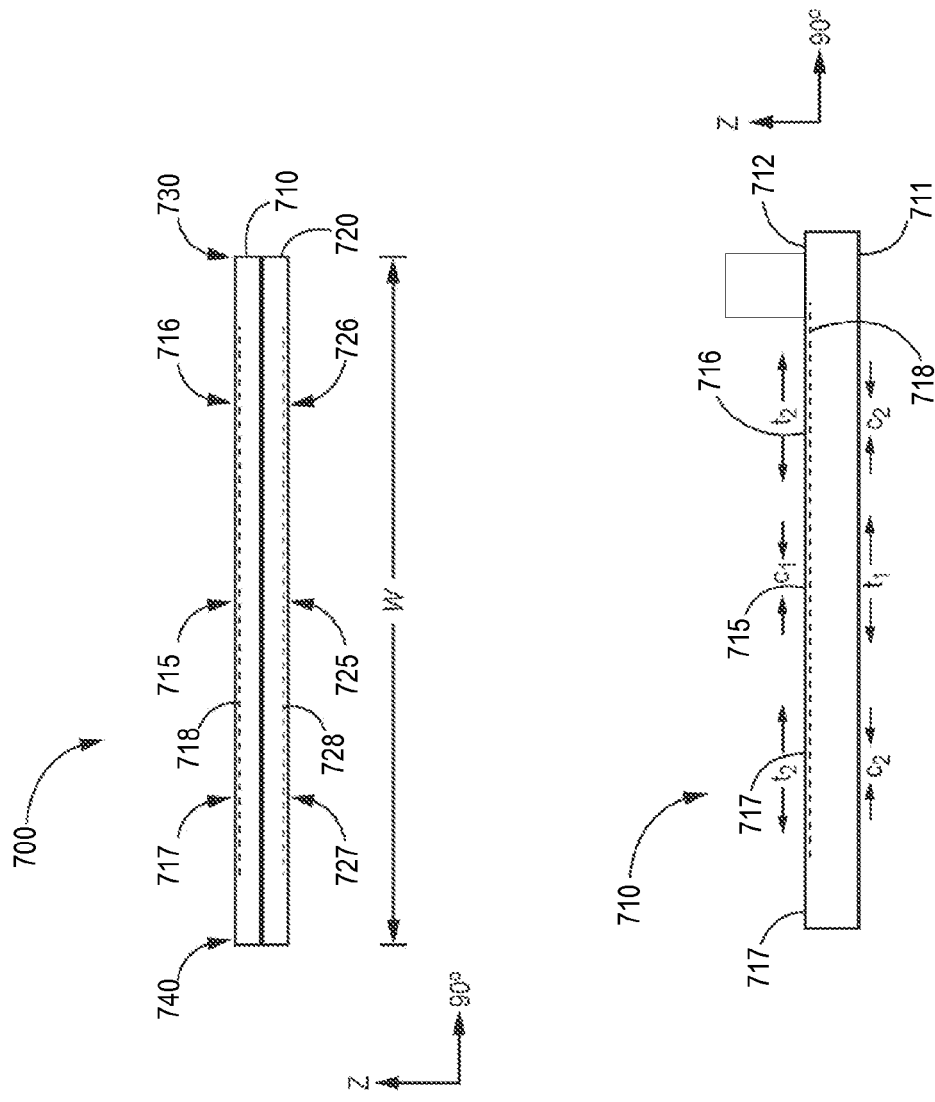
FIG. 12A illustrates a lateral cross-sectional view of the configuration depicted in FIG. 1 when flattened.
FIG. 12B illustrates a lateral cross-sectional view of the first elongate strip from FIG. 12A that depicts forces resulting from flattening of the elongate strip.

FIG. 12A illustrates a lateral cross-sectional view of the configuration depicted in FIG. 1 when flattened. Referring back to FIG. 7, in a variety of configurations the first elongate strip 710 and the second elongate strip 120 are each generally constructed to bias a first 719 and second 729 neutral bending planes (see FIGS. 13A-13B) of each elongate strip towards the first 711 and second 712 elongate strip inner surfaces, respectively, of the elongate member 100 and also bias first 707 and second 709 neutral flattening planes of the first 711 and second 721 elongate strip inner surfaces towards the first 712 and second 722 outer surfaces, respectively, of the elongate member 700.

FIG. 12A depicts a lateral cross sectional view of a flattened portion of the elongate member 700 of FIG. 11A, consistent with a portion of the elongate member 700 that may be disposed about the reel 1120 in FIG. 11A. In the flattened portion of the elongate member 700, each of the elongate strips second transition regions 716, 717, 726 and 727 and the first 715 and second 725 elongate strip peaks flatten relative to their initial shapes (as shown in FIG. 7), which causes compression in the peak areas 715, 725 and tension in the transition regions 716, 717, 726 and 727. In configurations where the peaks 715, 725 and the transitions radii 716, 717, 726 and 727 may have substantially equal radii, the compressive and tensile forces within the elongate strip 710, 720 when flattened may be substantially equalized across the width of the strip in the direction of the lateral 90°-axis.

FIG. 12B illustrates a lateral cross-sectional view of the first elongate strip from FIG. 12A that depicts forces resulting from flattening of the elongate strip. FIG. 12B depicts the first elongate strip 710 from FIG. 12A to illustrate the forces acting within each of the elongate strips resulting from flattening the strip. Each of the compression c and tensile t forces are located within the thickness of the elongate strip 700 and are in the lateral, 90°-axis direction. Flattening of the first elongate strip peak 715 results in compression forces c1 on the first elongate strip outer surface 712 of the first elongate strip 710 and tension forces t1 on the first elongate strip inner surface 711. Flattening of each first elongate strip first transition region 716 and first elongate strip second transition region 717 results in tension t2 on the first elongate strip outer surface 712 of the first elongate strip 710 and compression c2 on the first elongate strip inner surface 711. A first elongate strip neutral flattening plane 718 may be defined between the first elongate strip outer surface 712 and the first elongate strip inner surface 711 where the first elongate strip 710 is neither in tension nor in compression. The second elongate strip 720 (see FIG. 12A) will experience tension and compression similarly to the first elongate strip 710. In a variety of configurations, the materials and construction of the first elongate strip 710 and the second elongate strip 720 are chosen and combined in such a way to position first 718 and second 728 neutral flattening planes (see FIG. 12A) of each of the elongate strips 710, 720 closer to the outer surfaces 712, 722 than the inner surfaces 711, 721.

Regarding the material selection for the first elongate strip 710 and the second elongate strip 720, each strip may be constructed of a fabric. In many configurations the fabrics and combinations of fabrics bias the neutral bending plane of each elongate strip towards the inner surfaces of the elongate member 700 and bias the neutral flattening plane of each elongate strip towards the outer surfaces of the elongate member 700. Furthermore, the first elongate strip 710 and the second elongate strip 720 may include layers of woven or substantially unidirectional fibers will bias the neutral bending plane of each elongate strip 710, 720 closer to the inner surfaces than the outer surfaces of the elongate strip 710, 720, and will further bias the neutral flattening plane of each elongate strip 710, 720 closer to the outer surfaces than the inner surfaces of the elongate strip 710, 720.

Figure 13B:
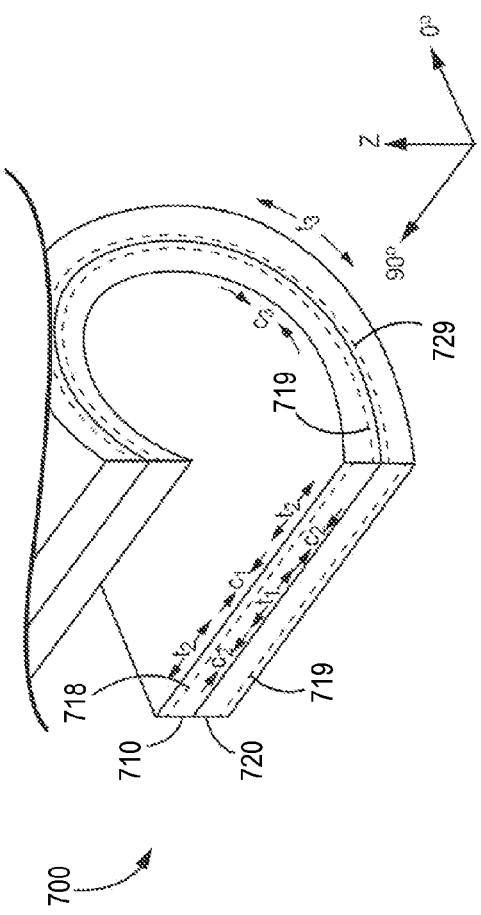
FIG. 13B illustrates a perspective view of a portion of a reeled elongate member consistent with the configuration depicted in FIG. 1.
Figure 13A:
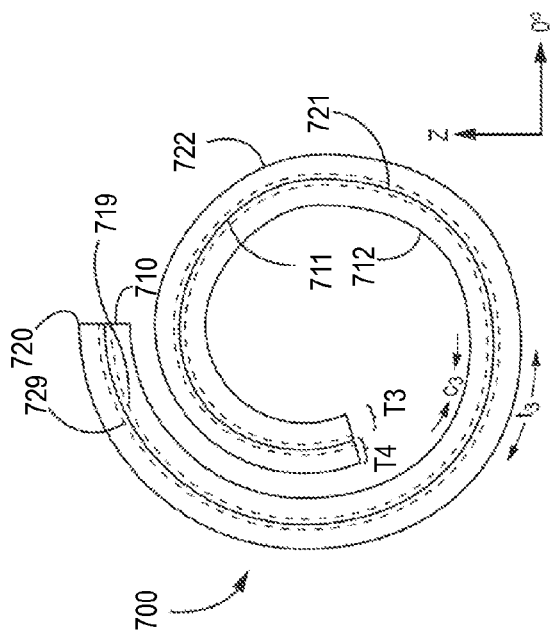
FIG. 13A illustrates a longitudinal cross-sectional view of a portion of a reeled elongate member consistent with the configuration depicted in FIG. 1.

FIG. 13A illustrates a longitudinal cross-sectional view of a portion of a reeled elongate member 700 consistent with the configuration depicted in FIG. 1 through the uncoupled region 750 (see FIG. 11A), which may be consistent with a portion of the elongate member 700 that may be disposed about the reel 1120 (see FIG. 11A). In a reeled position, for example, the first elongate strip 710 becomes the inner strip and experiences compression c3 as a result of being reeled. The second elongate strip 720 then, for example, becomes the outer strip and experiences tension t3 as a result of being reeled.

The sections of the first elongate strip 710 and the second elongate strip 720 that are un-bonded each define neutral bending planes 719, 729, respectively, which may be defined herein as the neutral plane associated with reeling the longitudinal length of the elongate member 700 about a 90°-axis. The neutral bending plane 719, 729 of the uncoupled region 750 of each elongate strip 710, 720 represents the plane at which there may be neither axial tension nor axial compression within the respective elongate strip 710, 720 when reeled. Each of the neutral bending planes 719, 729 extends along the length of its respective elongate strip 710, 720 (See FIG. 12A).

The elongate member 700 may be generally constructed of materials that define the neutral bending plane of the uncoupled region 750 of each elongate strip in a position that may be closer to inner surface 711, 721 than the outer surface 712, 722 of the respective elongate strip 710, 720. In other words, the first elongate strip 710 has a thickness T3 extending from the first elongate strip inner surface 711 to first elongate strip outer surface 712, and the first elongate strip defines a first neutral bending plane 719 through the thickness T3 that may be closer to the first elongate strip inner surface 711 than the first elongate strip outer surface 712. Similarly, the second elongate strip 720 has a thickness T4 extending from the second elongate strip inner surface 721 to the second elongate strip outer surface 722, and the second elongate strip defines a second neutral bending plane 729 that may be closer to the first elongate strip inner surface 711 than the second elongate strip outer surface 722.

In a variety of configurations it may be desirable to construct the elongate member 700 to position of the neutral bending plane of the uncoupled region 750 of each of the elongate strips 710, 720 to be relatively close together to minimize force differentials that may cause wear on the elongate member 700 may be collapsed and expanded over time. Similarly, it may be desirable to construct the elongate member 700 such that the position of the neutral bending plane remains the same regardless of the direction of reeling (clockwise or counterclockwise). Material choices for the first and second elongate strip may affect the position of neutral bending plane, as well as the placement of the materials and the combination of materials. Generally, the construction of the elongate strips 710, 720 biases the neutral bending plane of the uncoupled region 750 of the elongate strips 710, 720 towards the interior of the elongate member 700.

FIG. 13B illustrates a perspective view of a portion of a reeled elongate member consistent with the configuration depicted in FIG. 1 in a collapsed position. FIG. 13B further depicts the compression and tension forces reflected in FIGS. 12A and 12B for reference. In the current configuration, and in many configurations consistent with the technology disclosed herein, the first elongate strip 710, the second elongate strip 720 and the overall elongate member 700 are configured such that the first 718 and second 728 neutral flattening plane of each elongate strip 710, 720 may be isolated from the neutral bending plane 719, 729 of each elongate strip 710, 720. The term "isolated" may be used to mean that the neutral flattening plane may be configured to not intersect with the neutral bending plane. Such a configuration may limit the compounding of the tension and compression forces in two directions resulting from flattening and reeling.

Figure 14:
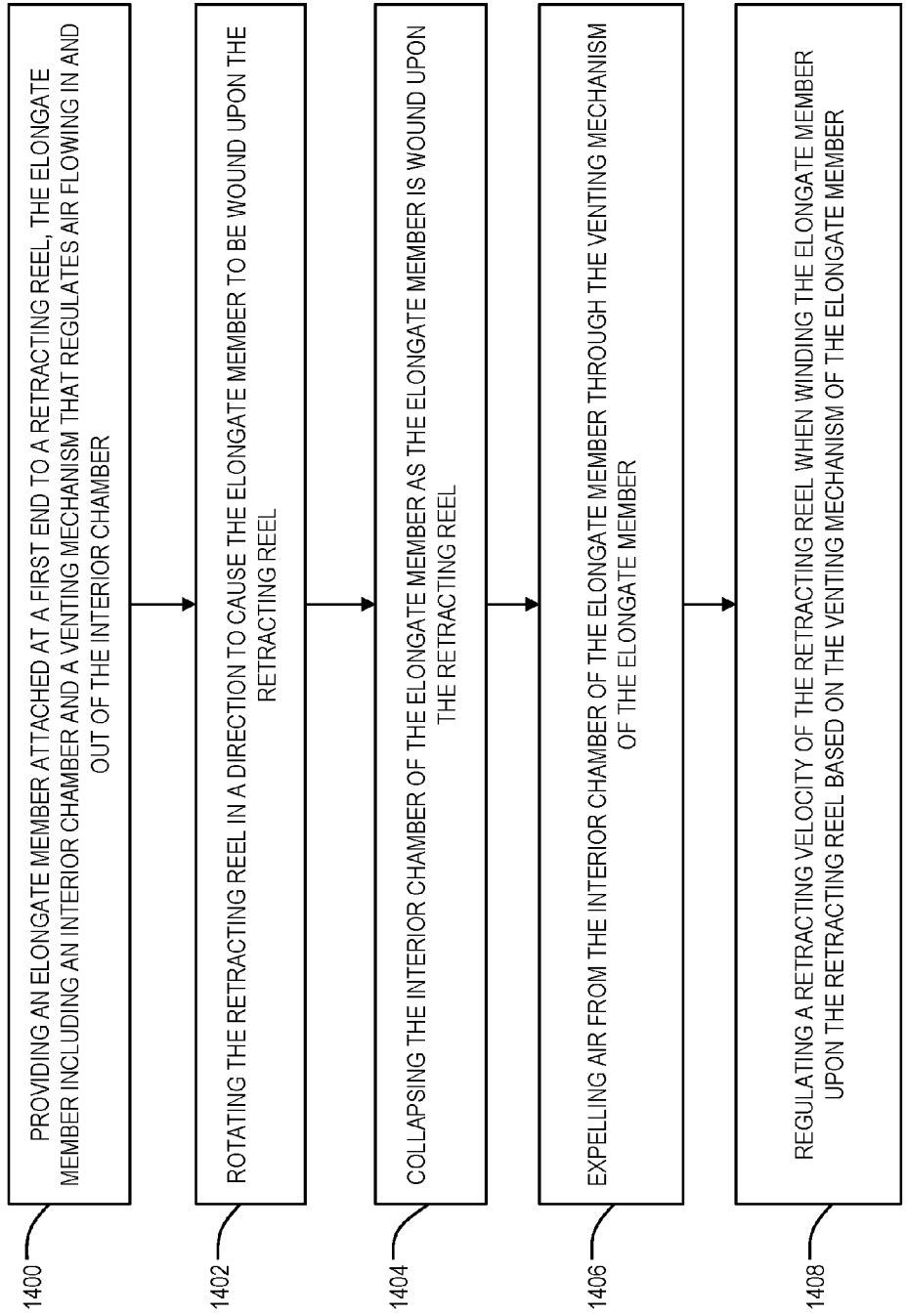
FIG. 14 illustrates a logic flowchart illustrating method of retracting an elongate member consistent with FIGS. 13A and 13B.

FIG. 14 illustrates a logic flowchart illustrating method of retracting an elongate member consistent with FIGS. 13A and 13B. The method includes retracting an elongated member 700 including providing 1400 an elongate member 700 attached at a first end 770 to a retracting reel 1120, the elongate member 700 including an interior chamber 704 and a venting mechanism 785, 790 that regulates air flowing in and out of the interior chamber 704. The retracting reel 1120 is retracted 1402 in a direction to cause the elongate member 700 to be wound upon the retracting reel 1120, thus collapsing 1404 the interior chamber 704 of the elongate member 700 as the elongate member is wound upon the retracting reel 1120. Air is expelled 1406 from the interior chamber 704 of the elongate member 700 through the venting mechanism 785, 790 of the elongate member 700, and a retracting velocity is regulated 1408 of the retracting reel 1120 when winding the elongate member 700 upon the retracting reel based on the venting mechanism 785, 790 of the elongate member 700.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. An apparatus comprising:
an elongate member having a first end and a second distal end, the elongate member further including
a first arcuate elongate member having first member longitudinal edges,
a second arcuate elongate member having second member longitudinal edges joined at the first member longitudinal edges to thereby define an interior chamber defined by an uncoupled region between the first and second arcuate elongate members, and
a venting mechanism comprising at least one aperture disposed through an outward facing surface of the elongated member enabling air to flow in and out of the interior chamber,
wherein each of the first and second arcuate elongate members further comprises at least a first layer of fiber material and a second layer of fiber material, where a majority of fibers in the first layer of fiber material are oriented substantially perpendicular to a majority of fibers in the second layer of fiber material.

2. The apparatus of claim 1, wherein the majority of fibers in the first layer of fiber material being oriented in a direction parallel to a longitudinal axis of the elongate member, and the majority of fibers in the second layer of fiber material being oriented in a direction perpendicular to the longitudinal axis of the elongate member.

3. The apparatus of claim 2, wherein the first and second arcuate members further comprise a composite material of a matrix material and the fiber material, the fiber material including one of:
a spun liquid crystal polymer;
carbon fiber;
aramid fiber;
glass fiber; or
carbon nanotubes.

4. The apparatus of claim 3, the matrix material including one of:
an epoxy resin; or
a thermoplastic resin.

5. The apparatus of claim 1, wherein the venting mechanism further includes at least one aperture at the second distal end of the elongate member capable of venting air from the interior chamber there-through when the elongate member is collapsed in upon the interior chamber.

6. The apparatus of claim 1, wherein the venting mechanism further includes a series of apertures proximate the second distal end of the elongate member capable of venting air from the interior chamber there-through when the elongate member is collapsed in upon the interior chamber.

7. The apparatus of claim 6, wherein the series of apertures proximate the second distal end of the elongate member are located a distance from the second distal end sufficient to cause an increase in collapsing resistance of the elongate member when the series of apertures are closed by collapsing the interior chamber of the elongate member.

8. The apparatus of claim 1, wherein a thickness of the elongate member and the corresponding first and second arcuate elongate members decreases from the first end to the second distal end of the elongate member.

9. The apparatus of claim 1, wherein a radius of the first and second arcuate elongate members changes between the first end to the second distal end of the elongate member.

10. The apparatus of claim 1, wherein the venting mechanism is configured to regulate air flowing in at out of the interior chamber when the venting mechanism is disposed a non-zero distance from the one of the first or second distal ends of the elongated member.

11. An apparatus comprising:
a housing having a housing aperture;
a spring biased retracting reel located within the housing; and
an elongated member having a first end attached to the spring biased retracting reel and having a second distal end outside of the housing, wherein the elongated member being capable of winding upon the spring biased retracting reel while translating through the housing aperture,
the elongate member further having an interior chamber and a venting mechanism comprising at least one first aperture disposed a non-zero distance from the second distal end of the elongated member and disposed through an outward facing surface of the elongated member enabling air to flow in and out of the interior chamber.

12. The apparatus of claim 11, wherein the elongate member further comprises a first arcuate elongate member having first member longitudinal edges and a second arcuate elongate member having second member longitudinal edges joined at the first member longitudinal edges thereby defining the interior chamber defined by an uncoupled region between the first and second arcuate elongate members, each of the first and second arcuate elongate members further comprises at least a first layer of fiber material and a second layer of fiber material, where a majority of fibers in the first layer of fiber material are oriented substantially perpendicular to a majority of fibers in the second layer of fiber material.

13. The apparatus of claim 12, the venting mechanism further comprising at least one second aperture at the second distal end of the elongate member capable of venting air from the interior chamber there-through when the elongate member is wound upon the spring biasing retracting reel.

14. The apparatus of claim 12, wherein the venting mechanism causes the spring biasing retracting reel to decrease in velocity when the interior chamber proximate the venting mechanism is retracted and collapsed within the housing and wound upon the spring biasing retracting reel.

15. The apparatus of claim 11, the at least one first aperture further comprising a series of apertures disposed a non-zero distance from the second distal end of the elongated member and disposed through the outward facing surface of the elongated member capable of venting air from the interior chamber there-through.

16. A method of retracting an elongated member comprising:
providing an elongated member attached at a first end to a retracting reel, the elongate member including an interior chamber and a venting mechanism comprising at least one first aperture disposed through an outward facing surface of the elongated member enabling air to flow in and out of the interior chamber;
rotating the retracting reel in a direction to cause the elongate member to be wound upon the retracting reel;
collapsing the interior chamber of the elongate member as the elongate member is wound upon the retracting reel;
expelling air from the interior chamber of the elongate member through the venting mechanism of the elongate member; and
regulating a retracting velocity of the retracting reel when the elongate member is wound thereupon based on collapsing a portion of the interior chamber proximate the venting mechanism of the elongate member.

17. The method of retracting the elongated member of claim 16, wherein providing the elongate member further includes providing a first arcuate elongate member having first member longitudinal edges and a second arcuate elongate member having second member longitudinal edges joined at the first member longitudinal edges thereby defining the interior chamber defined by an uncoupled region between the first and second arcuate elongate members, each of the first and second arcuate elongate members further comprises at least a first layer of fiber material and a second layer of fiber material, where a majority of fibers in the first layer of fiber material are oriented substantially perpendicular to a majority of fibers in the second layer of fiber material.

18. The method of retracting the elongated member of claim 16, wherein regulating the retracting velocity of the retracting reel when winding the elongate member upon the retracting reel based on the venting mechanism of the elongate member further includes providing the venting mechanism to include at least one aperture at a second distal end of the elongate member capable of venting air from the interior chamber there-through when the elongate member is wound upon the retracting reel.

19. The method of retracting the elongated member of claim 16, wherein regulating the retracting velocity of the retracting reel when winding the elongate member upon the retracting reel based on the venting mechanism of the elongate member further including a series of apertures disposed through the outward facing surface of the elongated member capable of venting air from the interior chamber there-through.

20. The method of retracting the elongated member of claim 16, further comprising reducing a retracting velocity of the rotating retracting reel when the elongate member is wound thereupon based on the venting mechanism being wound upon the retracting reel.

* * * * *